(12) United States Patent
Feister et al.

(10) Patent No.: US 11,831,103 B1
(45) Date of Patent: Nov. 28, 2023

(54) SELF-ALIGNING CONNECTOR ASSEMBLY

(71) Applicant: Lockheed Martin Corporation, Bethesda, MD (US)

(72) Inventors: James Feister, Centennial, CO (US); Christopher Leighton Brown, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 303 days.

(21) Appl. No.: 17/200,668

(22) Filed: Mar. 12, 2021

Related U.S. Application Data (60) Provisional application No. 63/137,670, filed on Jan. 14, 2021.

(51) Int. Cl.
H01R 13/631 (2006.01)
H01R 13/642 (2006.01)

(52) U.S. Cl.
CPC ....... *H01R 13/6315* (2013.01); *H01R 13/642* (2013.01); *H01R 2201/26* (2013.01)

(58) Field of Classification Search
CPC ............ H01R 2201/26; H01R 13/6315; H01R 13/642; H01R 13/6456
USPC ......................... 439/677, 680, 681, 246, 252
See application file for complete search history.

(56) References Cited

U.S. PATENT DOCUMENTS

| | | | | |
|---|---|---|---|---|
| 3,470,524 A * | 9/1969 | Culver | ................. | H01R 13/623 285/361 |
| 5,838,857 A * | 11/1998 | Niekrasz | ............. | G02B 6/3816 385/60 |
| 6,530,718 B2 * | 3/2003 | Nygren | ................. | B64G 1/645 403/337 |
| 6,558,177 B2 * | 5/2003 | Havener | ............... | H01R 24/50 439/246 |
| 6,769,830 B1 * | 8/2004 | Nygren | ................. | F16B 41/002 29/446 |
| 8,251,725 B2 * | 8/2012 | Kasparian | ............ | H01R 13/187 439/252 |
| 8,656,575 B1 * | 2/2014 | Bulow | ................. | H01R 13/622 439/127 |
| 9,027,969 B2 * | 5/2015 | Lin | ........................ | F16L 37/084 285/361 |
| 10,119,559 B1 * | 11/2018 | Powers | ............... | F15B 15/2861 |
| 11,025,008 B2 * | 6/2021 | Kim | ..................... | H01R 13/052 |
| 2010/0028097 A1 * | 2/2010 | Luepke | ................ | B23B 31/083 408/180 |

(Continued)

FOREIGN PATENT DOCUMENTS

CN 209692068 U * 11/2019

*Primary Examiner* — Marcus E Harcum
(74) *Attorney, Agent, or Firm* — BAKERHOSTETLER (57) ABSTRACT

A self-aligning connector assembly includes a connector frame, a connector, and an alignment adapter. The connector frame includes an end plate. The connector extends from the connector frame and is configured to engage with a mating connector. The alignment adapter is coupled to the connector. The alignment adapter is movable between a first position and a second position. In the first position, the alignment adapter is spaced apart from the end plate and permits the connector to move relative to the connector frame. In the second position, the alignment adapter is engaged against the end plate and prevents movement of the connector relative to the connector frame.

18 Claims, 6 Drawing Sheets

(56) References Cited

U.S. PATENT DOCUMENTS

2020/0119493 A1\* 4/2020 Mitter ................ H01R 13/6315
2021/0143581 A1\* 5/2021 Wu ...................... H01R 12/716

\* cited by examiner

SELF-ALIGNING CONNECTOR ASSEMBLY

CROSS-REFERENCE TO RELATED APPLICATIONS

This application claims the benefit and priority of U.S. Provisional Patent Application No. 63/137,670, filed Jan. 14, 2021, the entirety of which is incorporated herein by reference.

Statement Regarding Federally Sponsored Research or Development

Not applicable.

BACKGROUND

Field

The present description relates in general to connectors, and more particularly to, for example, without limitation, self-aligning connectors.

Description of the Related Art

The description provided in the background section should not be assumed to be prior art merely because it is mentioned in or associated with the background section. The background section may include information that describes one or more aspects of the subject technology.

Connectors can be utilized to facilitate connections between movable components, systems, or vehicles (e.g. spacecraft). During a connection process, connectors attached to movable components can be misaligned. Connectors can include a self-aligning mechanism that allows for misalignment between the connectors. In some applications, the self-aligning mechanism of the connector may move inadvertently when experiencing high forces (e.g. a launch of a spacecraft).

It would be advantageous to provide a connector that provides self-aligning functionality while preventing inadvertent movement of the self-aligning mechanism during high force events (e.g. the launch of a spacecraft).

SUMMARY

The subject technology is illustrated, for example, according to various aspects described below.

According to some embodiments, a self-aligning connector assembly includes a connector frame comprising an end plate; a connector extending from the connector frame, wherein the connector is configured to engage with a mating connector; and an alignment adapter coupled to the connector, wherein the alignment adapter is movable between a first position and a second position, the alignment adapter being spaced apart from the end plate and permitting the connector to move relative to the connector frame in the first position, and the alignment adapter being engaged against the end plate and preventing movement of the connector relative to the connector frame in the second position.

In some applications, the self-aligning connector assembly further includes an alignment cage moveable with the alignment adapter, wherein the alignment adapter is captured within the alignment cage and limits movement of the connector and the alignment adapter when the alignment adapter is in the first position. Further, the self-aligning connector assembly can include a biasing member disposed between alignment adapter and the alignment cage, wherein the biasing member is configured to urge the alignment adapter toward an aligned position relative to the alignment cage.

In some embodiments, the alignment adapter comprises a plurality of alignment posts extending radially from the alignment adapter, and a portion of the plurality of alignment posts extend radially beyond the alignment cage. Optionally, the alignment cage defines a plurality of detents, wherein the plurality of alignment posts are configured to engage with the plurality of detents to urge the alignment adapter toward an aligned position relative to the alignment cage. Further, the plurality of alignment posts are engaged against the end plate and the plurality of detents in the second position.

In some applications, the end plate defines at least one groove, and the at least one groove engages against a portion of the alignment adapter in the second position.

Further, the self-aligning connector assembly can include an actuator configured to move the alignment adapter between the first position and the second position.

The self-aligning connector assembly can also include a fluid line assembly in fluid communication with the connector. In some embodiments, the self-aligning connector assembly can include an electrical connector.

According to some embodiments, a self-aligning connector assembly includes a connector frame comprising an end plate; a connector extending from the connector frame, wherein the connector is configured to engage with a mating connector; an alignment adapter coupled to the connector; and an alignment cage capturing the alignment adapter, wherein the alignment cage is movable between a first position and a second position, the alignment cage being spaced apart from the end plate and permitting the alignment adapter to move relative to the alignment cage in the first position, and the alignment cage retaining the alignment adapter between the alignment cage and the end plate and preventing movement of the alignment adapter relative to the alignment cage in the second position.

In some applications, the alignment cage limits movement of the connector and the alignment adapter when the alignment cage is in the first position.

Optionally, the alignment adapter comprises a plurality of alignment posts extending radially from the alignment adapter, and a portion of the plurality of alignment posts extend radially beyond the alignment cage. Further, the alignment cage can define a plurality of detents, wherein the plurality of alignment posts are configured to engage with the plurality of detents to urge the alignment adapter toward an aligned position relative to the alignment cage. The self-aligning connector assembly can include a biasing member disposed between alignment adapter and the alignment cage, wherein the biasing member is configured to urge the plurality of alignment posts toward the plurality of detents. In some applications, the plurality of alignment posts are engaged against the end plate and the plurality of detents in the second position. Additionally, the end plate defines a plurality of grooves, and the plurality of grooves engages against the plurality of alignment posts in the second position.

Optionally, the self-aligning connector assembly includes an actuator configured to move the alignment cage between the first position and the second position.

According to some embodiments, a method includes permitting a connector to move relative to a connector frame; engaging an alignment adapter against the connector frame, wherein the alignment adapter is coupled to the connector; and preventing movement of the connector relative to the connector frame after engaging the alignment adapter against the connector frame.

The method can further include limiting movement of the alignment adapter via an alignment cage capturing the alignment adapter; and retaining the alignment adapter between the alignment cage and the connector frame to prevent movement of the connector.

Additionally, the method can include urging the alignment adapter toward an aligned position relative to the alignment cage.

In the following description, specific embodiments are described to shown by way of illustration how the invention may be practiced. It is to be understood that other embodiments may be utilized and changes may be made without departing from the scope of the present invention.

DETAILED DESCRIPTION

As described herein, self-aligning connectors can allow for misalignment between connectors. Certain conventional self-aligning connectors can be utilized to facilitate connections between movable components, systems, or vehicles.

In some applications, certain conventional self-aligning connectors can move to allow for misalignment between connectors. Certain conventional self-aligning connectors can utilize a spring or biasing member to align the connector and prevent inadvertent movement of the connector. However, certain conventional self-aligning connectors may move inadvertently when experiencing high forces (e.g. a launch of a spacecraft) that overcome the biasing force.

Further, certain conventional self-aligning connectors may be more susceptible to inadvertent movement when used with larger or more robust connectors (e.g. connectors suitable for fluid or cryogenic connections between spacecraft). While certain conventional self-aligning connectors can utilize biasing members with increased strength to align and retain the connectors, the conventional self-aligning connector may increase the connection force needed to move or align the self-aligning connector during the connection process.

Therefore, it is desirable to provide a self-aligning connector that allows for misalignment between connectors, the use of heavier and/or more robust connectors (e.g. suitable for fluid or cryogenic connections), and low connection forces, while preventing inadvertent movement of the connector during high force events (e.g. the launch of a spacecraft).

As appreciated by the present disclosure, embodiments of the self-aligning connector described herein allows for the connector to be captured or retained during high force events to prevent inadvertent movement of the connector, while allowing for misalignment between connectors, the use of heavier and/or more robust connectors, and low connection forces during the connection process.

The present description relates in general to connectors, and more particularly to, for example, without limitation, self-aligning connectors.

Figure 1:
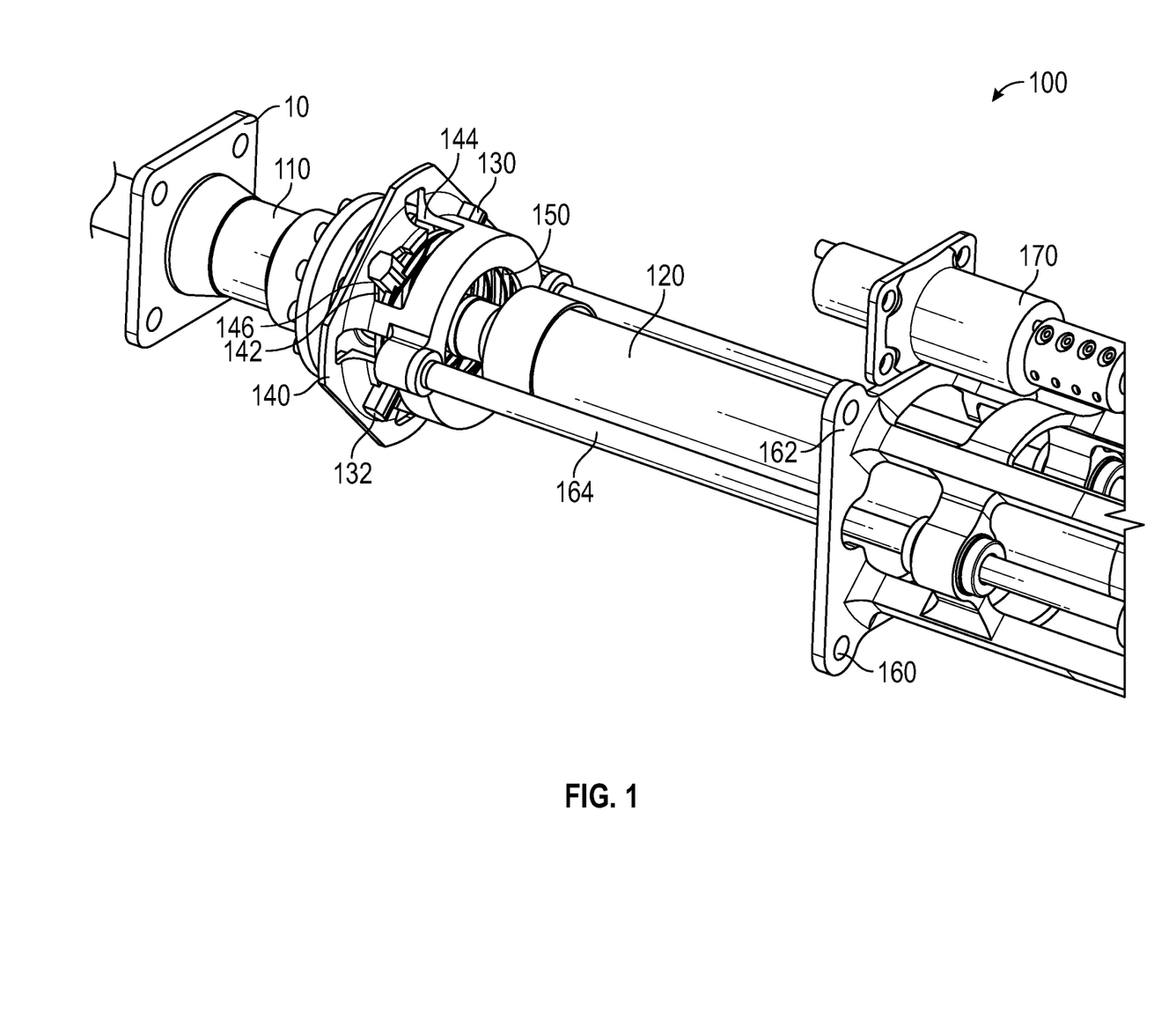
FIG. 1 is perspective view of a self-aligning connector assembly in an extended position, according to some embodiments of the present disclosure.
Figure 2:
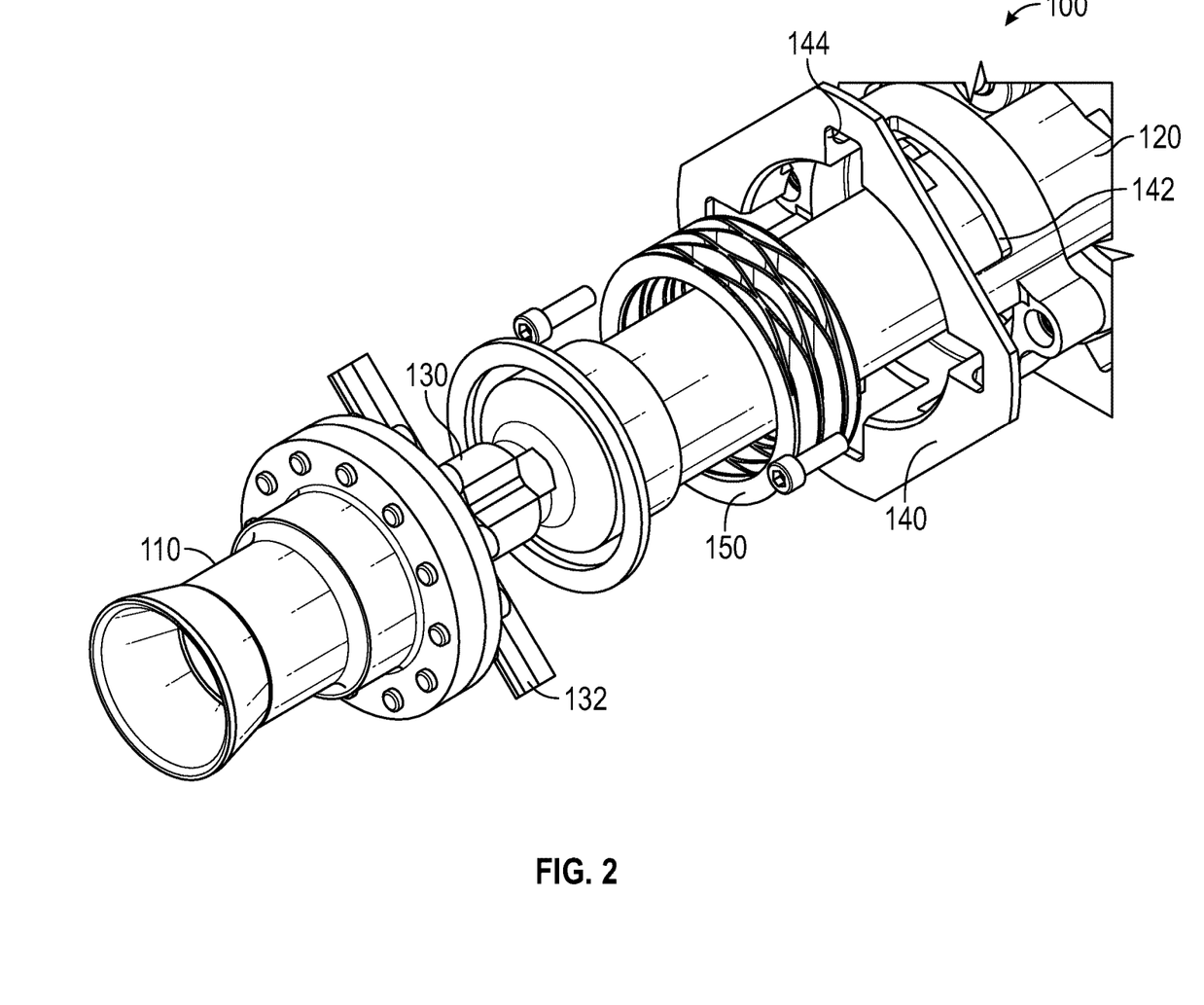
FIG. 2 is an exploded perspective view of the self-aligning connector assembly of FIG. 1.

FIG. 1 is perspective view of a self-aligning connector assembly 100 in an extended position, according to some embodiments of the present disclosure. FIG. 2 is an exploded perspective view of the self-aligning connector assembly 100 of FIG. 1. With reference to FIGS. 1 and 2, the self-aligning umbilical or connector assembly 100 allows for connections between movable components, systems, or vehicles (e.g. spacecraft). For example, the self-aligning connector assembly 100 can be coupled to a vehicle, such as a spacecraft and can facilitate a connection with a mating connector 10 coupled to another vehicle or component. In some embodiments, the connector frame 160 of the self-aligning connector assembly 100 can be coupled to the vehicle or other target component. Optionally, the connector frame 160 is rigidly coupled to the component.

In the depicted example, the self-aligning connector assembly 100 allows fluid flow or fluid communication between the mating connector 10 and the self-aligning connector assembly 100. In some embodiments, fluid from the mating connector 10 can flow into a connector 110 of the self-aligning connector assembly 100. Optionally, fluid can flow from the connector 110 and into a fluid line assembly 120 coupled or otherwise in fluid communication with the connector 110. In some embodiments, the fluid line assembly 120 can be extendable, flexible, and/or bendable.

As can be appreciated, the self-aligning connector assembly 100 can be utilized with fluid connections (e.g. cryogenic connections). However, the mechanisms of the self-aligning connector assembly 100 described herein can be utilized with electrical and/or other connections that allow for misalignment between connectors, the use of heavier and/or more robust connectors, and low connection forces during the connection process, while preventing inadvertent movement of the self-aligning connector assembly 100.

In the depicted example, the self-aligning connector assembly 100 includes a connector 110 to allow for the connection and/or disconnection of the self-aligning connector assembly 100 from the mating connector 10. As illustrated, the connector 110 can engage with, or otherwise couple with the mating connector 10 to provide a fluid-tight connection therebetween.

As described herein, the self-aligning connector assembly 100 can allow for misalignment between the connector 110 and the mating connector 10 during the connection process. For example, in some embodiments, the connector 110 can include a flared portion at a leading edge of the connector 110 that allows a misaligned mating connector 10 to be directed into a sealing connection with the connector 110. As illustrated, the flared portion of the connector 110 can have a leading portion with an increased radius that tapers or transitions to a reduced radius of the lumen 112 of the connector 110.

In the depicted example, the self-aligning connector assembly 100 can allow the connector 110 to move relative to the connector frame 160 to allow for misalignment between the connector 110 and the mating connector 10 during the connection process. During the connection process, the connector 110 can move radially and/or axially to align with or mate with the mating connector 10. Further, the construction of the self-aligning connector assembly 100 can allow the connector 110 to be thermally isolated from the connector frame 160, limiting heat transfer between the connector 110 and the connector frame 160. As illustrated, the structure of the self-aligning connector assembly 100 defines a tortuous heat transfer path between the connector 110 and the connector frame 160. In some embodiments, components of the self-aligning connector assembly 100, such as the connector 110 and/or the connector frame 160 can be formed from titanium or other suitable materials.

In some embodiments, the range of motion of the connector 110 can be limited or otherwise controlled by an alignment adapter 130 and an alignment cage 140. In the depicted example, an alignment adapter 130 can be coupled or otherwise attached to the connector 110 to allow the alignment adapter 130 to move with the connector 110. As illustrated, the alignment adapter 130 can be captured or otherwise retained within the alignment cage 140 to limit the movement of the alignment adapter 130 and therefore the connector 110 relative to the alignment cage 140. As can be appreciated, the alignment adapter 130 and/or the alignment cage 140 can be configured to allow the connector 110 sufficient range of motion to align with or mate with the mating connector 10.

In the depicted example, the alignment adapter 130 can include one or more alignment posts 132 that extend radially from the alignment adapter 130. The alignment adapter 130 can include any suitable number of alignment posts 132. As illustrated, the alignment adapter 130 can include four alignment posts 132. The alignment posts 132 can be evenly spaced around the alignment adapter 130. In some embodiments, the alignment posts 132 are symmetrically disposed around the alignment adapter 130.

The alignment posts 132 can extend through slots 142 formed in the alignment cage 140 to allow the alignment cage 140 to capture the alignment adapter 130 and limit the motion of the connector 110. The alignment cage 140 can define a number of slots 142 corresponding to the number of alignment posts 132. As illustrated, the geometry of the slots 142 can define the range of motion of the alignment adapter 130 and/or the connector 110 relative to the alignment cage 140. For example, the circumferential length of the slots 142 can define the radial range of motion of the alignment adapter 130 and/or the connector 110 relative to the alignment cage 140. Similarly, the axial length of the slots 142 can define the axial range of motion of the alignment adapter 130 and/or the connector 110 relative to the alignment cage 140.

Optionally, the alignment adapter 130 can be inserted or removed from the alignment cage 140 by aligning the alignment posts 132 with slots 144. In some embodiments, the alignment adapter 130 can be rotated to align the alignment posts 132 with the slots 144 to allow the alignment adapter 130 to be captured or removed from the alignment cage 140.

In the depicted example, the self-aligning connector assembly 100 can include a biasing member 150 to urge the connector 110 and/or the alignment adapter 130 toward an aligned position relative to the alignment cage 140. In some embodiments, the connector 110 and/or the alignment adapter 130 can be radially centered relative to the alignment cage 140 in an aligned position. In some embodiments, the biasing member 150 can be disposed within the alignment cage 140. As illustrated, the biasing member 150 can be disposed between the alignment adapter 130 and an inner surface of the alignment cage 140. In some embodiments, the biasing member 150 can be a spring, such as a wave spring, or any other suitable device that can provide a biasing force to the connector 110 and/or the alignment adapter 130.

In some embodiments, the biasing member 150 can bias the alignment posts 132 of the alignment adapter 130 toward a leading edge of the respective slots 142 to urge the connector 110 and/or the alignment adapter 130 toward an aligned position relative to the alignment cage 140. Optionally, the leading edge of each slot 142 can define a sloped portion or detent 146 to guide the respective alignment post 132 toward an aligned position and in turn, guide the alignment adapter 130 and/or the connector 110 to an aligned position. During operation, the biasing member 150 can urge the alignment posts 132 toward the leading edge of the respective slots 142 and advance each alignment post 132 along the sloped portion or detent 146 to an aligned position corresponding to the position of the detents 146, centering or aligning the connector 110 and/or the alignment adapter 130 relative to the alignment cage 140.

As can be appreciated, the biasing force supplied by the biasing member 150 can be sufficient to align the connector 110 and/or the alignment adapter 130 relative to the alignment cage 140. In some embodiments, the biasing force of the biasing member 150 can be overcome by high force events (e.g. a spacecraft launch) or by the use of more robust or heavier connectors 110, causing the connector 110 to move inadvertently relative to the connector frame 160 and/or the alignment cage 140.

Figure 3:
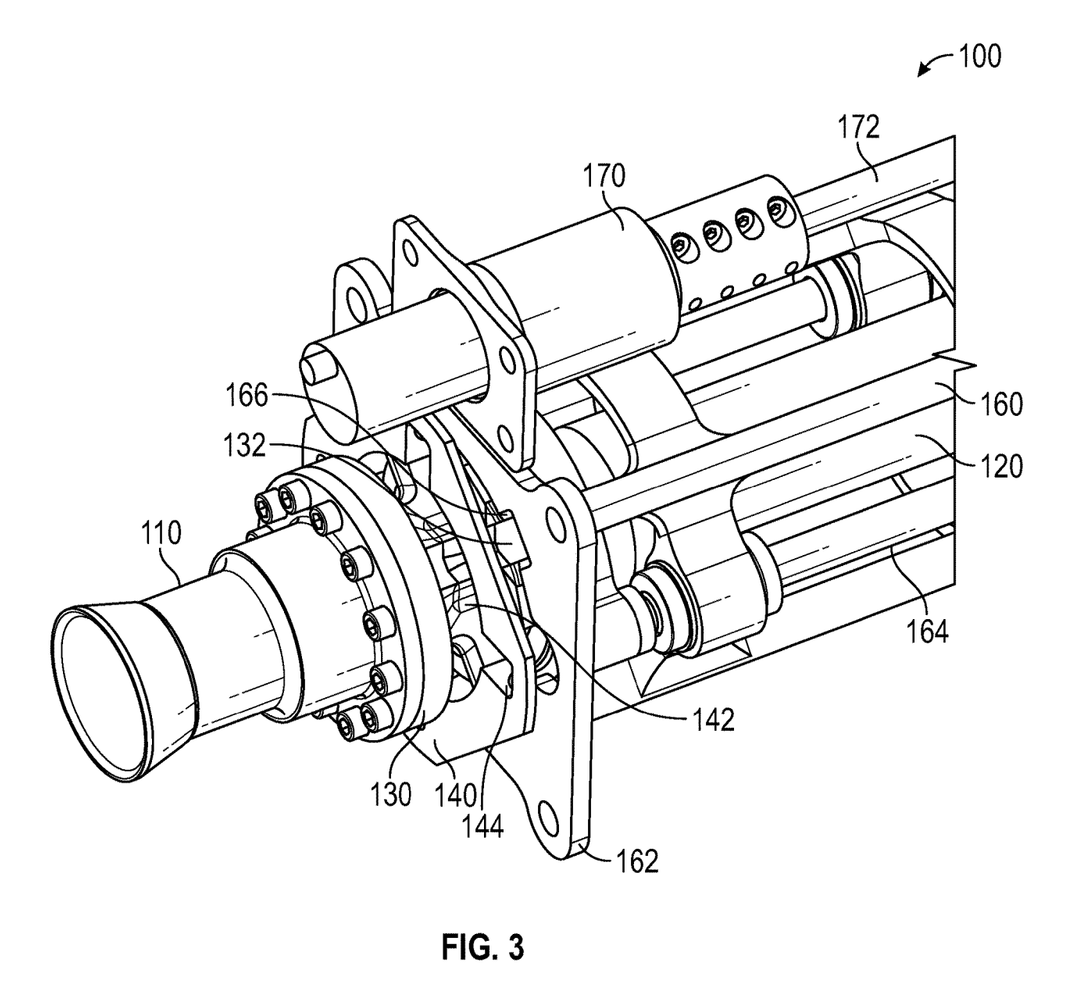
FIG. 3 is a perspective view of the self-aligning connector assembly of FIG. 1 in a retracted position.
Figure 4:
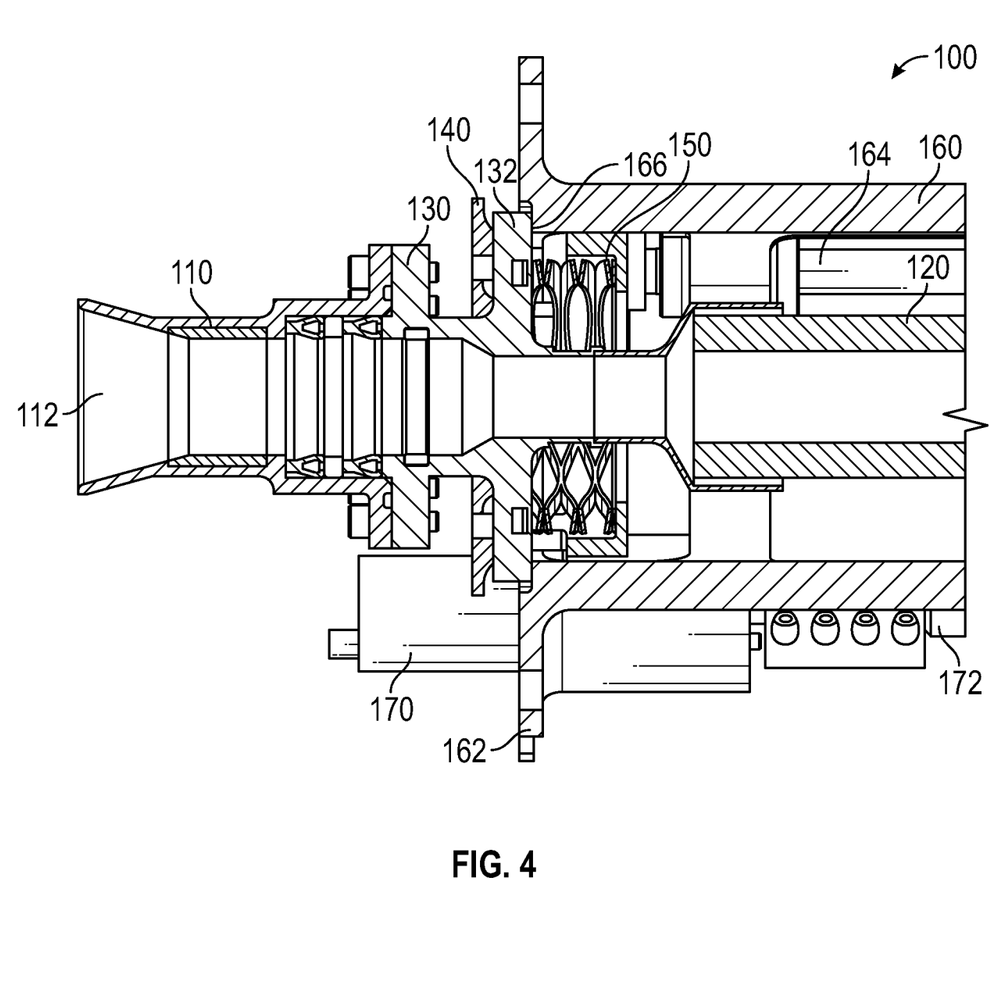
FIG. 4 is a cross-sectional view of the self-aligning connector assembly of FIG. 3.

FIG. 3 is a perspective view of the self-aligning connector assembly 100 of FIG. 1 in a retracted position. FIG. 4 is a cross-sectional view of the self-aligning connector assembly 100 of FIG. 3. As illustrated, the self-aligning connector assembly 100 can be moved from an extended position that allows for self-aligning functionality to a retracted position that prevents inadvertent movement of the connector 110. For example, the self-aligning connector assembly 100 can be moved to the retracted position during high force events.

In the depicted example, the self-aligning connector assembly 100 can retain the alignment posts 132 of the alignment adapter 130 to prevent inadvertent movement of the connector 110. As illustrated, the alignment posts 132 of the alignment adapter 130 can be disposed against or otherwise engaged with the end plate 162 of the connector frame 160 to prevent the alignment adapter 130 and/or the connector 110 from moving relative to the connector frame 160 and/or the alignment cage 140. In some embodiments, the end plate 162 can define detents or grooves 166 to receive the alignment posts 132. The grooves 166 can be positioned to retain the connector 110 in an aligned position relative to the connector frame 160 and/or the alignment cage 140.

In some embodiments, the alignment posts 132 can be captured between the alignment cage 140 and the end plate 162. As described herein, the alignment cage 140, the connector 110, and the alignment adapter 130 can be retracted or otherwise moved axially to capture the alignment posts 132 between the alignment cage 140 and the end plate 162. Optionally, the alignment posts 132 can be captured between the leading edge of the slots 142 and the end plate 162. The alignment posts 132 can be disposed within the detents 146 in the retracted position. In some embodiments, the alignment posts 132 are captured within the detents 146 of the alignment cage 140 and the grooves 166 of the end plate 162.

Advantageously, by retaining the alignment adapter 130 and the connector 110 by engaging the alignment posts 132 against the end plate 162 and/or the alignment cage 140, the connector 110 can be held in place without relying on the biasing force of the biasing member 150 during high force events. Further, by allowing the connector 110 to be retained during high force events, a lighter or more compliant biasing member 150 can be utilized for alignment purposes, reducing frictional and mating forces, allowing for lighter actuators and mitigating binding failures.

Figure 5:
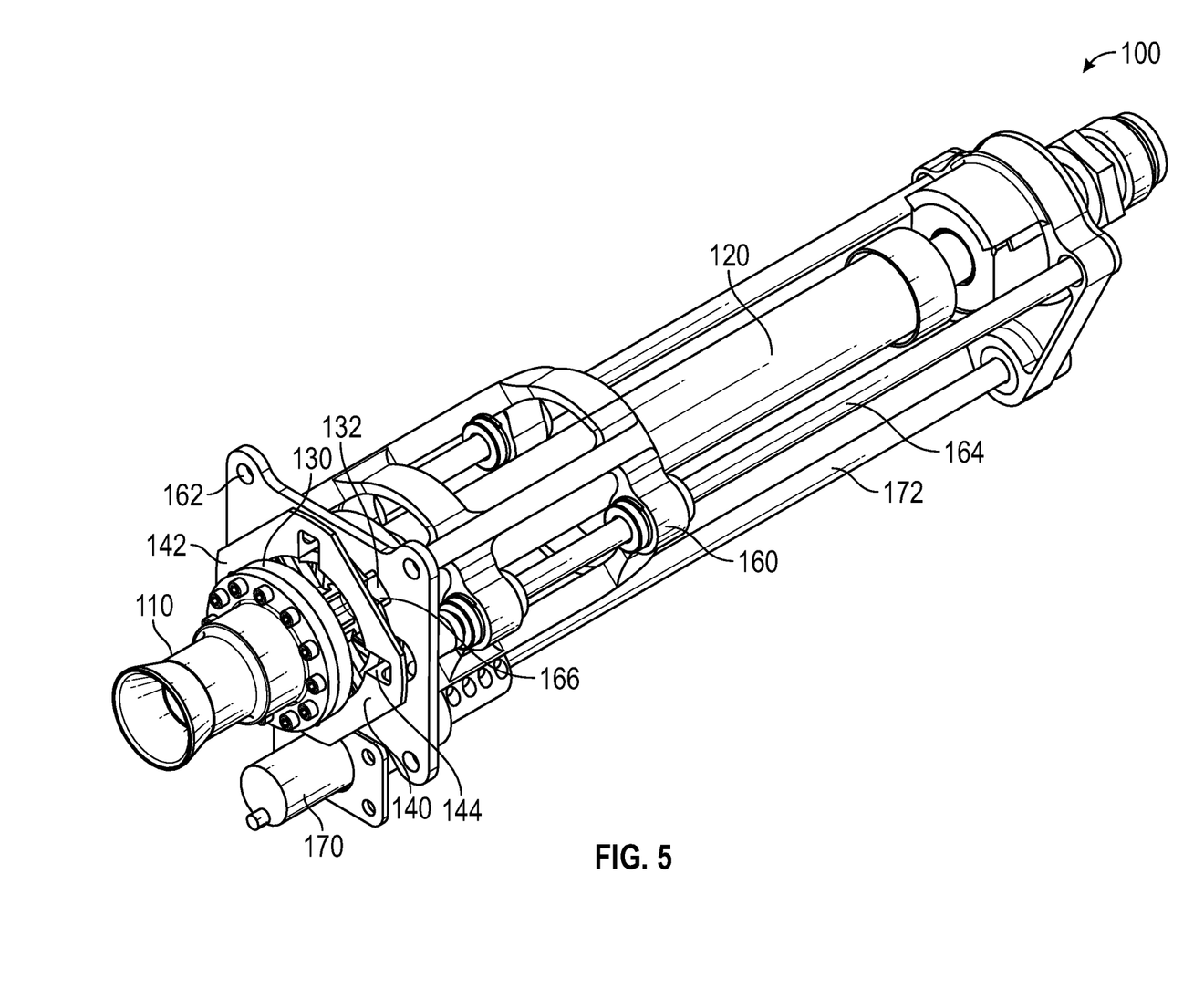
FIG. 5 is a perspective view of the self-aligning connector assembly of FIG. 1 in a retracted position.
Figure 6:
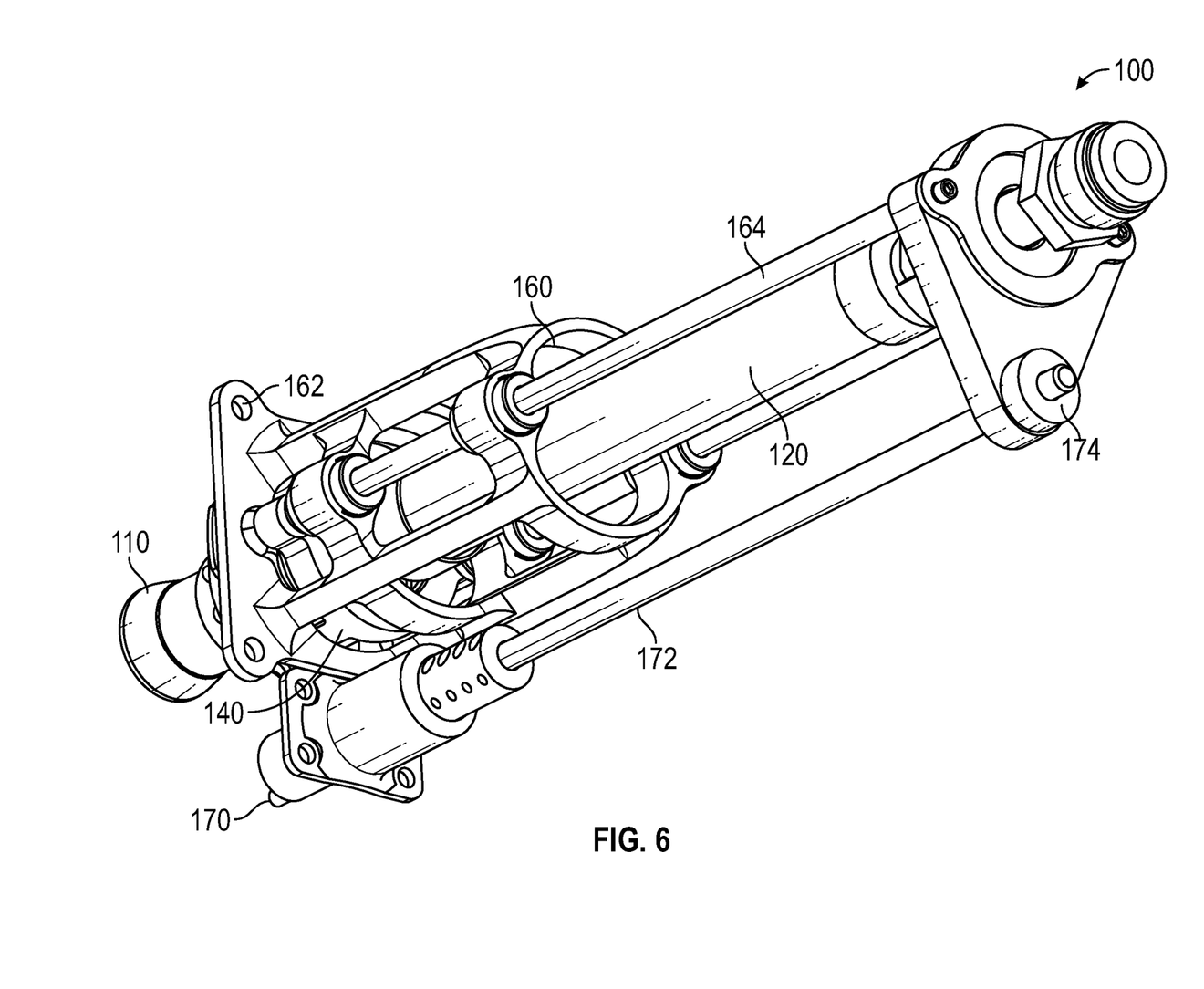
FIG. 6 is a reverse perspective view of the self-aligning connector assembly of FIG. 1 in a retracted position.

FIG. 5 is a perspective view of the self-aligning connector assembly 100 of FIG. 1 in a retracted position. FIG. 6 is a reverse perspective view of the self-aligning connector assembly 100 of FIG. 1 in a retracted position. With reference to FIGS. 5 and 6, and as described herein, the connector 110, the alignment adapter 130, and/or the alignment cage 140 can be moved between an extended position relative to the connector frame 160 that allows for self-aligning functionality to a retracted position relative to the connector frame 160 that prevents inadvertent movement of the connector 110 relative to the connector frame 160.

In the depicted example, the alignment cage 140 can be moved relative to the connector frame 160. In some embodiments, one or more tubes or rods 164 can slide to allow the alignment cage 140 to move relative to the connector frame 160 while remaining in axial alignment with the connector frame 160. In the depicted example, the captured alignment adapter 130 and the connector 110 can move with the alignment cage 140. In some embodiments, the fluid line assembly 120 coupled to the connector 110 and the alignment adapter 130 can extend or retract with the alignment cage 140.

In some embodiments, an actuator 170 can move the alignment cage 140, and in turn the alignment adapter 130 and the connector 110 relative to the connector frame 160. As illustrated, the actuator 170 can impart force on the connector frame 160 and/or the alignment cage 140 to move the alignment cage 140 between an extended and retracted position. In some embodiments, the actuator rod 172 can apply force to the connector frame 160 and/or the alignment cage 140 and maintain alignment between the connector frame 160 and the actuator 170. For example, the actuator rod 172 can be threaded and can apply force to the connector frame 160 by rotating relative to a fixed nut 174 coupled to the connector frame 160. In some embodiments, the actuator 170 can be an actuator with a linear flexible bellow.

Terms such as "top," "bottom," "front," "rear", "above", and "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U. S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A self-aligning connector assembly, comprising:
   a connector frame comprising an end plate;
   a connector extending from the connector frame, wherein the connector is configured to engage with a mating connector; and
   an alignment adapter coupled to the connector, wherein the alignment adapter is movable between a first position and a second position, the alignment adapter being spaced apart from the end plate and permitting the connector to move relative to the connector frame in the first position, and the alignment adapter being engaged against the end plate and preventing movement of the connector relative to the connector frame in the second position;
   an alignment cage moveable with the alignment adapter; and
   a biasing member disposed between alignment adapter and the alignment cage, wherein the biasing member is configured to urge the alignment adapter relative to the alignment cage.

2. The self-aligning connector assembly of claim 1, wherein the alignment adapter is captured within the alignment cage and limits movement of the connector and the alignment adapter when the alignment adapter is in the first position.

3. The self-aligning connector assembly of claim 2, wherein the alignment adapter comprises a plurality of alignment posts extending radially from the alignment adapter, and a portion of the plurality of alignment posts extend radially beyond the alignment cage.

4. The self-aligning connector assembly of claim 3, wherein the alignment cage defines a plurality of detents, wherein the plurality of alignment posts are configured to engage with the plurality of detents to urge the alignment adapter toward an aligned position relative to the alignment cage.

5. The self-aligning connector assembly of claim 4, wherein the plurality of alignment posts are engaged against the end plate and the plurality of detents in the second position.

6. The self-aligning connector assembly of claim 1, wherein the end plate defines at least one groove, and the at least one groove engages against a portion of the alignment adapter in the second position.

7. The self-aligning connector assembly of claim 1, further comprising an actuator configured to move the alignment adapter between the first position and the second position.

8. The self-aligning connector assembly of claim 1, further comprising a fluid line assembly in fluid communication with the connector.

9. The self-aligning connector assembly of claim 1, wherein the connector comprises an electrical connector.

10. A self-aligning connector assembly, comprising:
a connector frame comprising an end plate;
a connector extending from the connector frame, wherein the connector is configured to engage with a mating connector;
an alignment adapter coupled to the connector, the alignment adapter comprising a plurality of alignment posts extending radially from the alignment adapter;
an alignment cage capturing the alignment adapter, the alignment cage defines a plurality of detents configured to engage the plurality of alignment posts, wherein the alignment cage is movable between a first position and a second position, the alignment cage being spaced apart from the end plate and permitting the alignment adapter to move relative to the alignment cage in the first position, and the alignment cage retaining the alignment adapter between the alignment cage and the end plate and preventing movement of the alignment adapter relative to the alignment cage in the second position; and
a biasing member disposed between alignment adapter and the alignment cage, wherein the biasing member is configured to urge the plurality of alignment posts toward the plurality of detents.

11. The self-aligning connector assembly of claim 10, wherein the alignment cage limits movement of the connector and the alignment adapter when the alignment cage is in the first position.

12. The self-aligning connector assembly of claim 10, wherein a portion of the plurality of alignment posts extend radially beyond the alignment cage.

13. The self-aligning connector assembly of claim 12, wherein the plurality of alignment posts are configured to engage with the plurality of detents to urge the alignment adapter toward an aligned position relative to the alignment cage.

14. The self-aligning connector assembly of claim 13, wherein the plurality of alignment posts are engaged against the end plate and the plurality of detents in the second position.

15. The self-aligning connector assembly of claim 13, wherein the end plate defines a plurality of grooves, and the plurality of grooves engages against the plurality of alignment posts in the second position.

16. A method, comprising:
permitting a connector to move relative to a connector frame, the connector frame comprising an end plate;
engaging an alignment adapter against the connector frame, wherein the alignment adapter is coupled to the connector;
permitting, by the alignment adapter in a first position, the connector to move relative to the connector frame, wherein the alignment adapter is spaced apart from the end plate in the first position;
preventing, by the alignment adapter in a second position different from the first position, movement of the connector relative to the connector frame after engaging the alignment adapter against the connector frame; and
urging, by a biasing member disposed between alignment adapter and an alignment cage, the alignment adapter relative to the alignment cage.

17. The method of claim 16, further comprising:
limiting movement of the alignment adapter, in the second position, via the alignment cage capturing the alignment adapter; and
retaining the alignment adapter between the alignment cage and the connector frame to prevent movement of the connector.

18. The method of claim 17, wherein the alignment adapter engages the end plate in the second position.

* * * * *